United States Patent
Hosokawa

(10) Patent No.: US 6,910,737 B2
(45) Date of Patent: Jun. 28, 2005

(54) SEAT RECLINING DEVICES

(75) Inventor: Kazuhisa Hosokawa, Toyota (JP)

(73) Assignee: Araco Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 10/165,077

(22) Filed: Jun. 6, 2002

(65) Prior Publication Data

US 2002/0185903 A1 Dec. 12, 2002

(30) Foreign Application Priority Data

Jun. 7, 2001 (JP) .................................... 2001-172836

(51) Int. Cl.[7] .............................................. B60N 2/02
(52) U.S. Cl. ...................................... 297/362; 297/367
(58) Field of Search ................................ 297/362, 367, 297/378.1; 475/162

(56) References Cited

U.S. PATENT DOCUMENTS

| 2,973,214 | A | | 2/1961 | Bates et al. ................. 287/126 |
| 4,195,881 | A | * | 4/1980 | Kluting et al. ........... 297/216.13 |
| 4,470,633 | A | | 9/1984 | Fourrey et al. ............. 297/362 |
| 4,629,251 | A | | 12/1986 | Tezuka ......................... 297/362 |
| 5,152,631 | A | | 10/1992 | Bauer ........................... 403/372 |
| 5,553,922 | A | * | 9/1996 | Yamada ........................ 297/362 |
| 5,632,525 | A | | 5/1997 | Uramichi .................... 297/367 |
| 5,634,689 | A | | 6/1997 | Putsch et al. ................ 297/362 |
| 5,810,442 | A | * | 9/1998 | Ito et al. .................. 297/362.11 |
| 6,007,153 | A | * | 12/1999 | Benoit et al. ............ 297/378.12 |
| 6,357,828 | B1 | * | 3/2002 | Sugimoto .................... 297/365 |

FOREIGN PATENT DOCUMENTS

| DE | 1 911 806 | | 8/1965 | |
| EP | 0967110 A3 | | 12/1999 | |
| FR | 10.10.911 | | 6/1952 | |
| FR | 2578601 | * | 9/1986 | |
| JP | 02299608 | | 12/1990 | ........... A47C/1/022 |
| JP | 08228876 A | | 9/1996 | |

* cited by examiner

*Primary Examiner*—Peter M. Cuomo
*Assistant Examiner*—Stephen Vu
(74) *Attorney, Agent, or Firm*—Patterson, Thuente, Skaar & Christensen, P.A.

(57) ABSTRACT

Seat reclining devices for a vehicle seat may include a first seat reclining mechanism (10) having a first rotational shaft (18) and a second seat reclining mechanism (60) having a second rotational shaft (62). A connector sleeve (34) may interconnect or couple the first and second rotational shafts such that the rotational shafts can be substantially synchronously rotated. A nesting coupling (40) having a clearance (S) is preferably defined between the connector sleeve and one of the first or second rotational shafts (i.e., the inner rotational shaft). An elastic member (50, 50A) may be disposed within the clearance in order to prevent the inner rotational shaft from directly contacting the connector sleeve.

19 Claims, 8 Drawing Sheets

SEAT RECLINING DEVICES

This application claims priority to Japanese Patent Application Serial Number 2001-172836, the contents of which are incorporated herein by reference.

BACKGROUND OF THE INVENTION

1. Field of the Invention

The present invention relates to seat reclining devices for a vehicle seat. More particularly, the present invention relates to seat reclining devices for a vehicle seat that comprise a seat reclining mechanism disposed on each side of the vehicle seat.

2. Description of the Related Art

As shown in FIG. 9, a known seat reclining device for a vehicle seat (not shown) includes a first (outer) seat reclining mechanism 70 and a second (inner) seat reclining mechanism 74. These two seat reclining mechanisms 70 and 74 are utilized in order to provide sufficient support strength between a seat back and a seat cushion (not shown) of the vehicle seat. As will be recognized, the outer and inner seat reclining mechanisms 70 and 74 are respectively disposed on the left and right sides of the vehicle seat.

The outer seat reclining mechanism 70 includes a pair of opposing disk-like housings, i.e., a first housing 12 and a second housing 14. The first housing 12 is affixed to a cushion frame 30 that supports the vehicle seat cushion. The second housing 14 is affixed to a seat back frame 32 that supports the vehicle seat back. The first and second housings 12 and 14 are circumferentially connected by a fastener or clip ring 16 so that the first housing 12 can move or rotate relative to the second housing 14 around a rotational axis L. Further, the rotational axis L corresponds to a common centerline of the first and second housings 12 and 14.

The outer seat reclining mechanism 70 also includes a rotational rod or shaft 72 that extends along the rotational axis L through the cushion frame 30 and the seat back frame 32, as well as through the first and second housings 12 and 14. As shown in FIG. 11(A), the first rotational shaft 72 includes a first (inner) extended portion 72a having a rectangular shape in cross section and an outer diagonal dimension P1. Also, the first rotational shaft 72 includes a second (outer) extended portion (manipulating portion) 28, which portion is typically connected to a seat operation handle or lever (not shown).

As best shown in FIGS. 10(A) and 10(B), the outer seat reclining mechanism 70 further includes a locking means that can prevent the first housing 12 from rotating relative to the second housing 14, and thereby lock the seat reclining mechanism 70. The locking means essentially consists of a hinge cam 20, a slide member 24 and a pair of pawls 26 that are received within the housings 12 and 14. The hinge cam 20 is secured to or integrally formed with the first rotational shaft 72, so as to rotate with the first rotational shaft 72. The slide member 24 is laterally movably or slidably attached to the first housing 12. The slide member 24 includes a specially shaped central bore 24a that receives the hinge cam 20. The central bore 24a partially engages the hinge cam 20, so that the slide member 24 can laterally slide or move in the direction shown by arrow D1 when the first rotational shaft 72 rotates. As will be recognized, the slide member 24 is configured in order to reliably prevent the slide member 24 from rotating relative to the first housing 12.

In addition, the pawls 26 are vertically movably or slidably attached to the first housing 12. One pawl 26 is disposed on each side of the slide member 24 and the pair of pawls 26 is configured to engage the slide member 24. Thus, the pawls 26 can vertically slide or shift in the direction shown by arrow D2. As will be recognized, the pawls 26 are configured in order to reliably prevent the pawls 26 from rotating relative to the first housing 12.

Further, as shown in FIGS. 10(A) and 10(B), the second housing plate 14 has an inner circular surface 14a. A pair of concave toothed portions 15 circumferentially extend over two separate portions of the inner circular surface 14a. Each of the pawls 26 has a curved outer surface 26a. A corresponding convex toothed portion 27 is provided on each pawl 26 for releasably engaging the respective concave toothed portions 15.

In addition, as shown in FIG. 9, a biasing (spiral) spring 22 is disposed within the first housing 12. The spiral spring 22 urges (biases) the first rotational shaft 72 in the direction shown by arrow D3 (counterclockwise). As a result, the first rotational shaft 72 is normally retained in a locked position, which position corresponds to the position shown in FIG. 10(A). When the first rotational shaft 72 is retained in the locked position, the slide member 24 is positioned at the leftmost position. When the slide member 24 is retained in this position, the slide member 24 pushes or urges the respective pawls 26 in opposite outward directions so that the respective convex toothed portions 27 engage the concave toothed portions 15. In this state, the first housing 12 is prevented from rotating relative to the second housing 14, thereby locking the outer seat reclining mechanism 70. As a result, the seat back frame 32 is locked in position relative to the cushion frame 30 and thus, the seat back is locked relative to the seat cushion.

When the first rotational shaft 72 is rotated in the direction shown by arrow D4 (clockwise) against the urging force of the spiral spring 22, the first rotational shaft 72 rotates toward an unlocked position, which position corresponds to the position shown in FIG. 10(B). When the first rotational shaft 72 is rotated to the unlocked position, the slide member 24 is positioned in the rightmost position. When the slide member 24 is retained in this position, the slide member 24 moves or pushes the respective pawls 26 in the inward direction, so that the convex tooth portions 27 disengage from the concave toothed portions 15. In this state, the first housing 12 can freely rotate relative to the second housing 14, thereby unlocking the outer seat reclining mechanism 70. As a result, the seat back frame 32 can freely rotate or pivot relative to the cushion frame 30, such that the seat back can be tilted relative to the seat cushion.

With the exception of one aspect, the inner seat reclining mechanism 74 has substantially the same construction as the outer seat reclining mechanism 70. The difference is that the inner seat reclining mechanism 74, which includes a rotational rod or shaft 76 that has an inner extended portion 76a similar to the inner extended portion 72a, does not include an outer extended portion or manipulation portion 28. Further description of the inner seat reclining mechanism 74 can be omitted, because the remaining constructions are the same.

In the above-described known seat reclining device, the first rotational shaft 72 is interconnected with the second rotational shaft 76 via a connector sleeve 78. The connector sleeve 78 has a rectangular shape in cross section and this rectangular shape corresponds to the rectangular shape of the inner extended portion 72a of the first rotational shaft 72. As shown in FIG. 11(A), the connector sleeve 78 has an inner diagonal dimension P2 that is larger than the outer diagonal dimension P1 of the inner extended portion 72a. The inner extended portion 72a is inserted into the connector sleeve 78, to thereby define a loose nesting coupling 80 between the inner extended portion 72a and the connector sleeve 78. On the other hand, the inner extended portion 76a of the second rotational shaft 76 is inserted into and welded to the connector sleeve 78, thereby securely or fixedly connecting the second rotational shaft 76 to the connector sleeve 78. As shown in FIG. 9, a portion of the periphery of the connector sleeve 78 is removed in order to define a removed portion 79 that is welded to the outer surface of the inner extended portion 76a.

Thus, the first rotational shaft 72 is rotationally and synchronously coupled to the second rotational shaft 76, such rotation of the first rotational shaft 72 will be transmitted to the second rotational shaft 76. Therefore, when the seat operation lever is pivoted or rotated, thereby rotating the first rotational shaft 72, the second rotational shaft 76 is also driven or rotated. Consequently, both seat reclining mechanisms 70 and 74 can be simultaneously or synchronously unlocked by simply operating the seat operation lever that is attached to the first rotational shaft 72. As a result, the seat back frame 32 can be rotated relative to the cushion frame 30 by simply operating the seat operation lever, thereby enabling the seat back to be tilted relative to the seat cushion.

As described above, because the inner diagonal dimension P2 of the connector sleeve 78 is greater than the outer diagonal dimension P1 of the inner extended portion 72a, a clearance S is defined between the inner extended portion 72a and the connector sleeve 78 (FIG. 11(A)). The clearance S allows the first rotational shaft 72 to idly rotate with respect to the connector sleeve 78 by a small degree. As a result, the first rotational shaft 72 can be freely and oppositely rotated relative to the second rotational shaft 76, which is integrally formed with the connector sleeve 78.

By attaching the outer and inner reclining mechanisms 70 and 74 to the seat cushion and the seat back, these parts are interconnected and form a reclinable vehicle seat. The vehicle seat thus assembled is then mounted within a vehicle body (not shown) in a vehicle assembly line. However, the vehicle seat may be twisted or deformed while being mounted within the vehicle body. Such twisting may result from inaccurate positioning due to dimensional errors between a seat attachment (not shown) of the seat and a seat mount (not shown) of the vehicle body. If the vehicle seat is twisted while being mounted to the vehicle body, the outer seat reclining mechanism 70 will be rotationally deviated from the inner seat reclining mechanism 74. In other words, if the vehicle seat is twisted while being mounted within the vehicle body, the reclining mechanisms 70 and 74 will be rotated in opposite directions relative to each other. As a result, the first rotational shaft 72 also will be rotated in an opposite direction relative to the second rotational shaft 76.

As described above, because the clearance S is formed between the inner extended portion 72a and the connector sleeve 78, the first rotational shaft 72 can freely rotate without interfering with the second rotational shaft 76. Thus, even if the outer reclining mechanism 70 is rotationally deviated from the inner reclining mechanism 74, the relative deviation of the outer and inner reclining mechanisms 70 and 74 can be effectively compensated. As a result, even if the vehicle seat is twisted while being mounted, such twisting of the seat may not have any adverse effect on the function of the seat reclining mechanisms 70 and 74.

As will be recognized, the outer and inner reclining mechanisms 70 and 74 must be attached to the vehicle seat such that the first rotational shaft 72 is conformably or appropriately positioned relative to the connector sleeve 78, as shown in FIG. 11(A). In other words, when the outer and inner reclining mechanisms 70 and 74 are attached to the vehicle seat, the first rotational shaft 72 must be positioned in such a manner that it does not contact the connector sleeve 78. In this case, the clearance S will extend continuously around the first rotational shaft 78, so that the first rotational shaft 72 does not contact the connector sleeve 78. If the first rotational shaft 72 is thus positioned relative to the connector sleeve 78, the first rotational shaft 72 can freely rotate in either direction (clockwise and counterclockwise) with respect to the connector sleeve 78. Therefore, even if the outer reclining mechanism 70 is somewhat rotationally deviated in either direction with respect to the inner reclining mechanism 74 while the vehicle seat is being mounted within the vehicle body, such relative deviation of the outer and inner reclining mechanisms 70 and 74 can be effectively compensated.

However, the outer and inner reclining mechanisms 70 and 74 also may be attached to the vehicle seat such that the first rotational shaft 72 is non-conformably or inappropriately positioned relative to the connector sleeve 78, as shown by a solid line in FIG. 11(B). In other words, when the outer and inner reclining mechanisms 70 and 74 are being attached to the vehicle seat, the first rotational shaft 72 may be positioned in such a manner that the first rotational shaft contacts the connector sleeve 78. In this case, the clearance S will not be continuous.

If the first rotational shaft 72 is thus positioned relative to the connector sleeve 78, the first rotational shaft 72 can freely rotate in only one direction (i.e., clockwise) with respect to the connector sleeve 78. Therefore, if the outer reclining mechanism 70 is rotationally deviated clockwise with respect to the inner reclining mechanism 74 when the vehicle seat is being mounted to the vehicle body, such relative deviation of the outer and inner reclining mechanisms 70 and 74 can be reliably compensated. However, if the outer reclining mechanism 70 is rotationally deviated in the opposite direction (i.e., counterclockwise) with respect to the inner reclining mechanism 74 when the vehicle seat is being mounted within the vehicle body, such relative deviation of the outer and inner reclining mechanisms 70 and 74 can not be compensated. In this case, the first rotational shaft 72 is prevented from freely rotating in the counterclockwise direction with respect to the connector sleeve 78.

That is, if the outer reclining mechanism 70 is rotationally deviated counterclockwise with respect to the inner reclining mechanism 74, the first rotational shaft 72 may generate a counterclockwise rotational force within the connector sleeve 78, so as to force or bias the connector sleeve 78 in the counterclockwise direction. However, the connector sleeve 78 can not rotate in the counterclockwise direction, because the second rotational shaft 76, which is integrally formed with the connector sleeve 78, is prevented from excessively rotating past the locked position. As noted above, the locked position of the first rotational shaft 72 is shown in FIG. 10(A). As a result, the first rotational shaft 72 is forced or urged to reversibly rotate (i.e., rotate in the clockwise direction) against the biasing force of the spiral spring 22. Thus, the first rotational shaft 72 will rotate from the locked position as shown in FIG. 10(A) toward the unlocked position as shown in FIG. 10(B). Such reverse rotation of the first rotational shaft 72 may cause an incomplete locking or half locking of the reclining mechanism 70.

Furthermore, as shown by a broken line in FIG. 11(B), the outer and inner reclining mechanisms 70 and 74 may be attached to the vehicle seat such that the first rotational shaft 72 is non-conformably positioned relative to the connector sleeve 78 in the opposite direction. If the first rotational shaft 72 is thus positioned relative the connector sleeve 78, the first rotational shaft 72 can freely rotate in only one direction (i.e., the counterclockwise direction) with respect to the connector sleeve 78. Therefore, if the outer seat reclining mechanism 70 is rotationally deviated in the counterclockwise direction with respect to the inner seat reclining mechanism 74 when the vehicle seat is being mounted within the vehicle body, such relative deviation of the outer and inner seat reclining mechanisms 70 and 74 can be reliably compensated. However, if the outer reclining mechanism 70 is rotationally deviated in the opposite direction (i.e., clockwise) with respect to the inner reclining mechanism 74 when the vehicle seat is being mounted within the vehicle body, such relative deviation of the outer and inner reclining mechanisms 70 and 74 can not be compensated. In this case, the first rotational shaft 72 is prevented from freely rotating in the clockwise direction with respect to the connector sleeve 78.

That is, if the outer seat reclining mechanism 70 is rotationally deviated in the clockwise direction with respect to the inner seat reclining mechanism 74, the first rotational shaft 72 may generate a clockwise rotational force within the connector sleeve 78, so as to force or bias the connector sleeve 78 in the clockwise direction. Therefore, the connector sleeve 78 is forced or urged to rotate in the clockwise direction against a biasing force of a spiral spring (not shown) disposed within the inner reclining mechanism 74. At this time, the first rotational shaft 72 can not rotate in the reverse (counterclockwise) direction, because the first rotational shaft 72 is prevented from excessively rotating past its locked position (FIG. 10(A)). As a result, the second rotational shaft 76, which is integrally formed with the connector sleeve 78, will rotate from its locked position toward its unlocked position. Such rotation of the second rotational shaft 76 may cause an incomplete locking or half locking of the reclining mechanisms 74.

SUMMARY OF THE INVENTION

It is, accordingly, one object of the present teachings to provide improved seat reclining devices.

For example, in one aspect of the present teachings, a seat reclining device for a vehicle seat may include a first seat reclining mechanism having a first rotational shaft and a second seat reclining mechanism having a second rotational shaft. A sleeve (or connector sleeve) may interconnect or couple the first and second rotational shafts such that the rotational shafts can be substantially synchronously rotated. One (hereinafter, "the inner rotational shaft") of the first and second rotational shafts is preferably inserted into the sleeve and the other rotational shaft is preferably directly coupled to the sleeve. A nesting coupling having a clearance may be defined between the sleeve and the inner rotational shaft. Further, an elastic member is preferably received within at least a portion of the clearance in order to reliably prevent the inner rotational shaft from directly contacting the sleeve.

Thus, the rotational shafts may be reliably conformably positioned relative to the sleeve when the first and second reclining mechanisms are attached to the vehicle seat. That is, the inner rotational shaft can be reliably positioned so that the inner rotational shaft does not contact the sleeve. Therefore, the inner rotational shaft can freely rotate in either direction (clockwise and counterclockwise) with respect to the sleeve. As a result, even if the first seat reclining mechanism is somewhat rotationally deviated in either direction with respect to the second seat reclining mechanism when the vehicle seat assembly is being mounted within the vehicle body, such relative deviation of the reclining mechanisms can be effectively compensated.

Other objects, features and advantage of the present invention will be ready understood after reading the following detailed description together with the accompanying drawings and the claims.

DETAILED DESCRIPTION OF THE INVENTION

Figure 1:
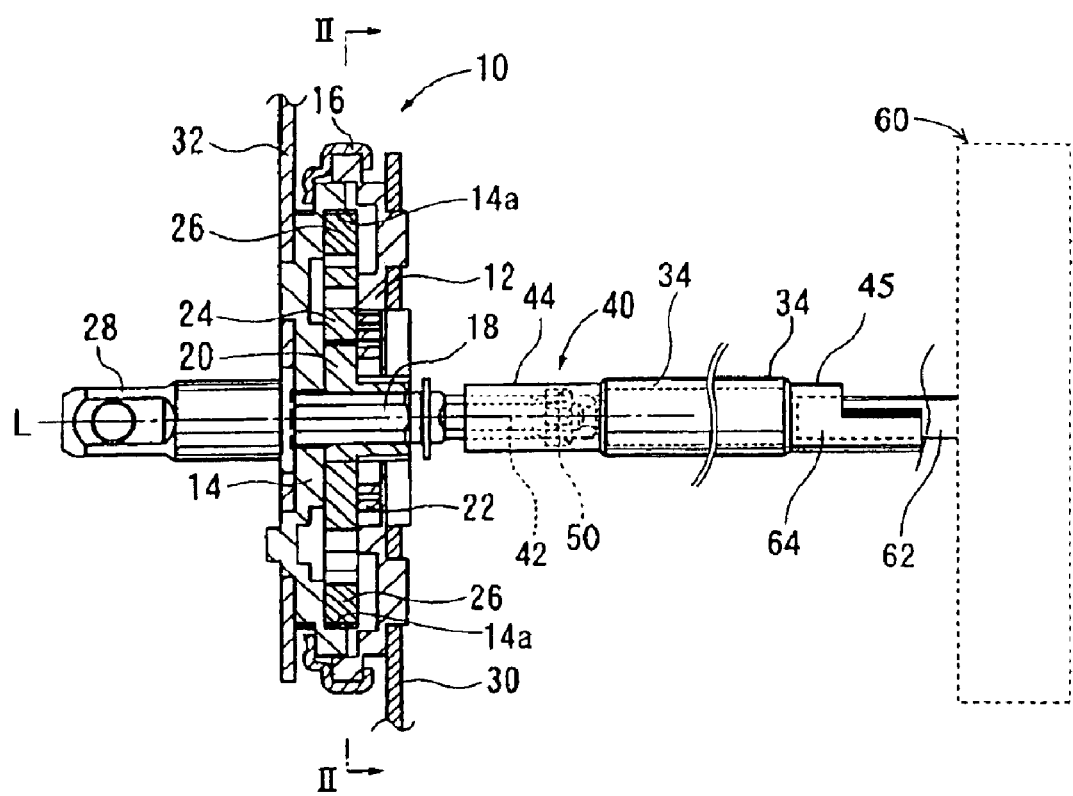
FIG. 1 is a vertical, cross-sectional view of a seat reclining device of the present teachings.
Figure 2:
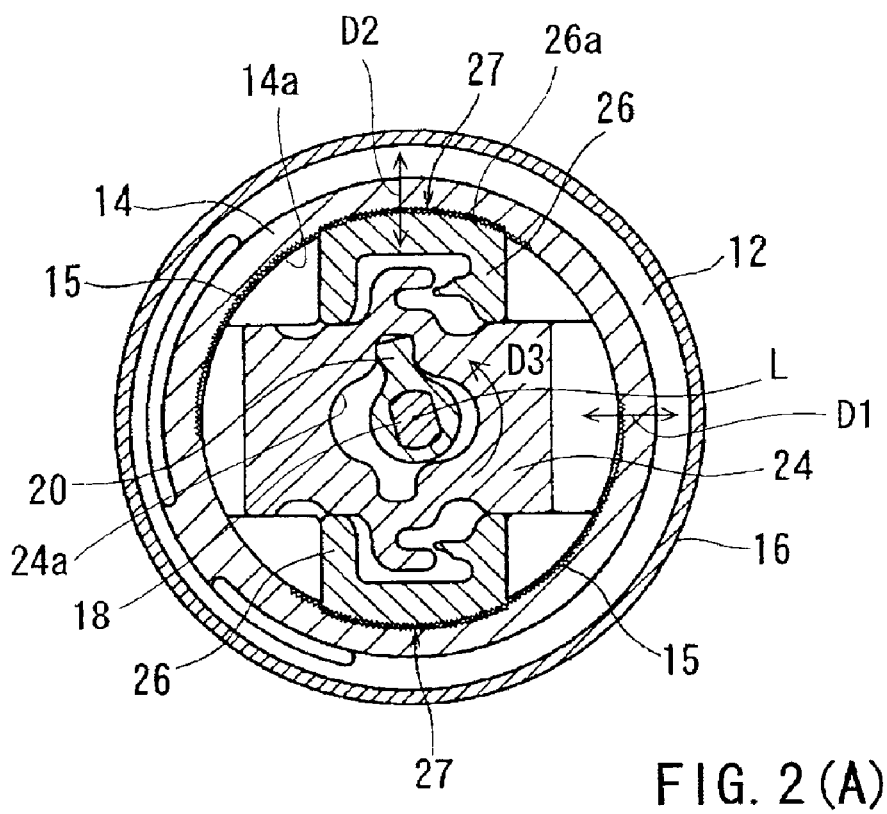
FIG. 2(A) is a cross-sectional view taken along line II—II in FIG. 1, which view illustrates a locked position of a rotational shaft of the seat reclining device.
FIG. 2(B) is a cross-sectional view taken along line II—II shown in FIG. 1, which view illustrates an unlocked position of the rotational shaft of the seat reclining device.
Figure 2:
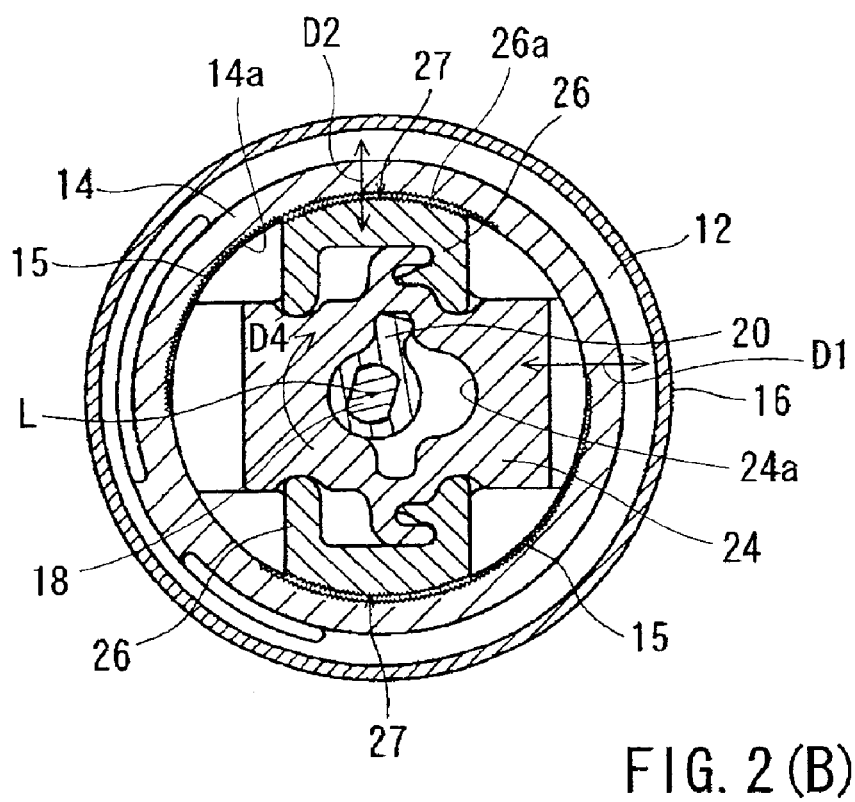

In one embodiment of the present teachings, a seat reclining device for a vehicle seat may include a first seat reclining mechanism having a first rotational shaft and a second seat reclining mechanism having a second rotational shaft. A sleeve may couple the first rotational shaft to the second rotational shaft, such that the rotational shafts can be substantially synchronously rotated. The sleeve may cooperate with one of the rotational shafts (e.g., an inner rotational shaft), to thereby form a nesting coupling defining a clearance between the inner rotational shaft and the sleeve. An elastic member may be disposed within the clearance in order to prevent the inner rotational shaft from directly contacting the sleeve. In this embodiment, the inner rotational shaft can be reliably positioned in such a manner that the inner rotational shaft will not contact the sleeve when the first and second reclining mechanisms are attached to the vehicle seat. Optionally, the elastic member may be fixedly attached to the inner rotational shaft in a manner that enables the elastic member to contact the sleeve.

In another embodiment of the present teachings, an annular groove may be defined within the inner rotational shaft so as to encircle the inner rotational shaft. In this case, the elastic member may be arranged and constructed to be received within the annular groove. Optionally, the elastic member may include a plurality of cushioning strips, which cushioning strips may be designed to directly contact the sleeve. The cushioning strips are preferably disposed substantially perpendicularly to closed loop or polygon. That is, a closed loop portion of the elastic member is preferably designed to be received within the annular groove and the cushioning strips preferably extend perpendicularly with respect to the closed loop.

In addition, the inner rotational shaft may include a plurality of additional grooves for receiving the respective cushioning strips. The rotational shaft may have a rectangular shape in cross section, so that the additional grooves may respectively extend along the corner edges of the rotational shaft.

In another embodiment of the present teachings, the inner rotational shaft may comprise a hollow end portion. A cavity may be defined within the hollow end portion and a plurality of slots may extend within the inner rotational shaft and along the cavity. In this case, the elastic member may be arranged and constructed to be received within the cavity and to partially project through the slots. Optionally, the elastic member may include a plurality of cushioning strips that are arranged and constructed to project through the slots and contact the sleeve. The rotational shaft may have a rectangular shape in cross section, so that the slots may respectively extend along the corner edges of the rotational shaft.

Representative examples of the present invention have been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

First Detailed Representative Embodiment

Figure 9:
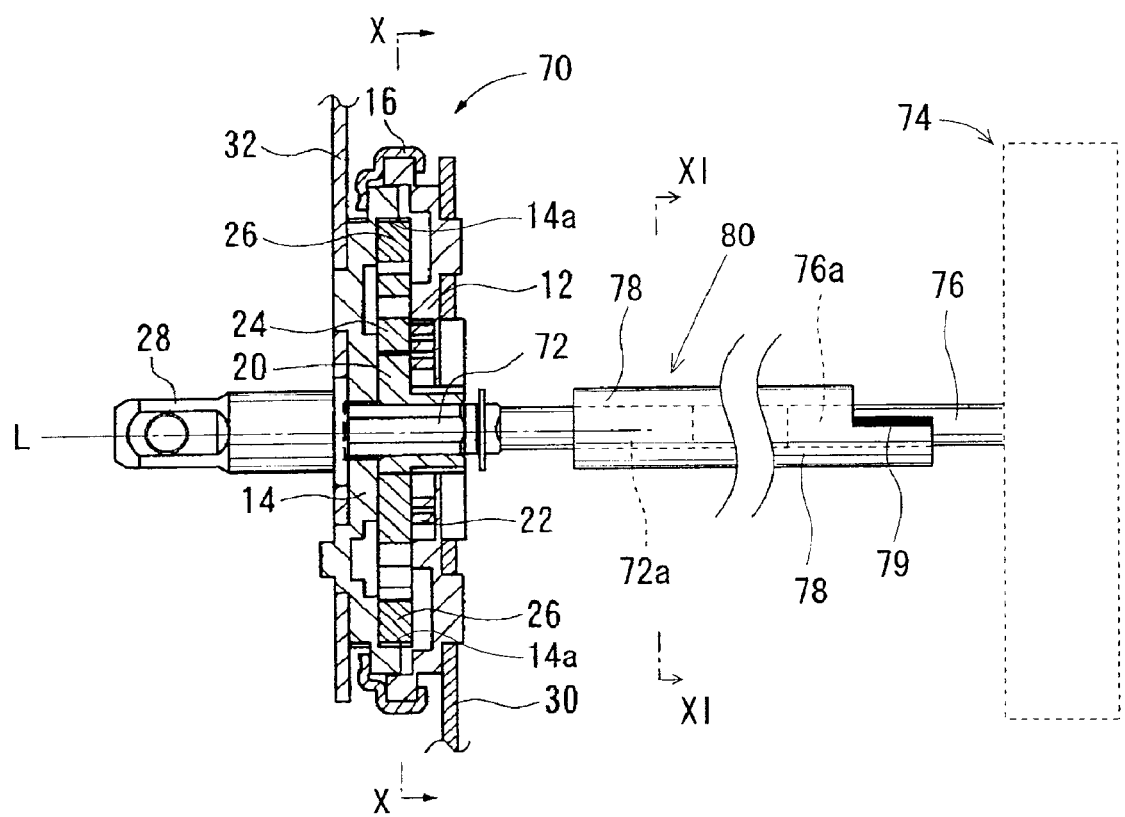
FIG. 9 is a vertical, cross-sectional view of a seat reclining device of the prior art.
Figure 10:
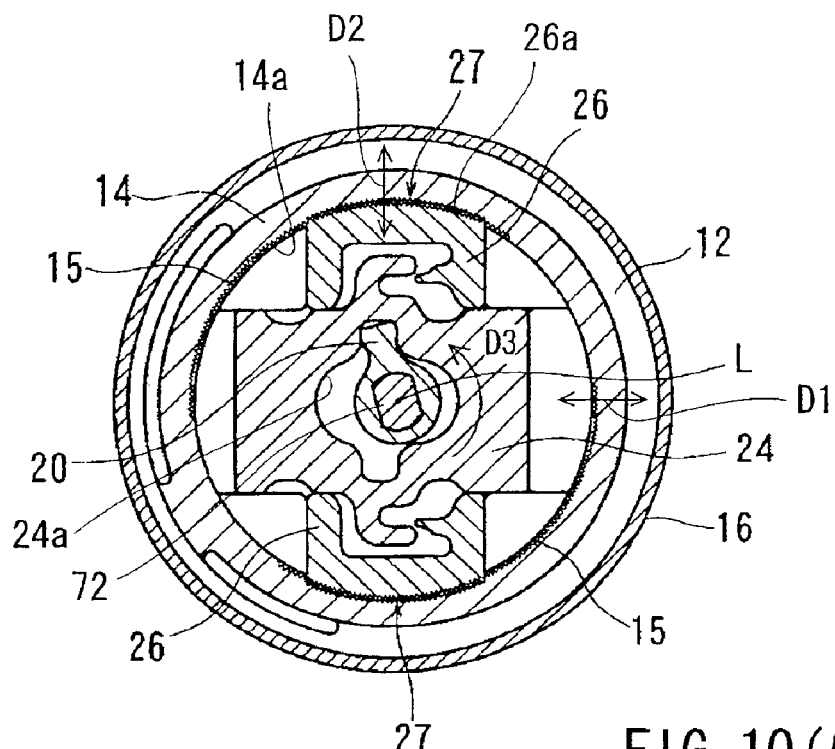
FIG. 10(A) is a cross-sectional view taken along line X—X shown in FIG. 9, which view illustrates a locked position of a rotational shaft of the prior art seat reclining device.
FIG. 10(B) is a cross-sectional view taken along line X—X in FIG. 9, which view illustrates an unlocked position of the rotational shaft of the prior art seat reclining device.
Figure 10:
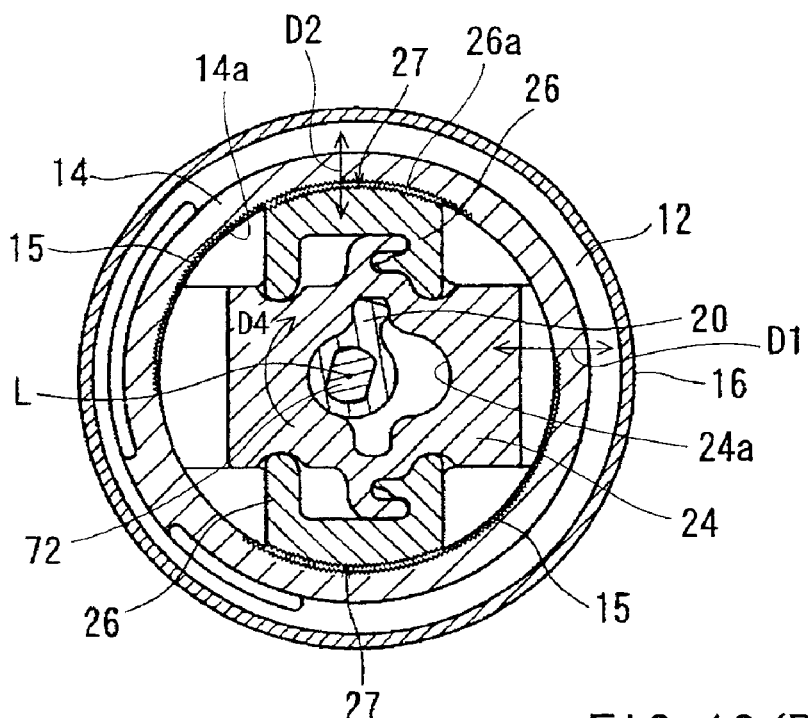
Figure 11:
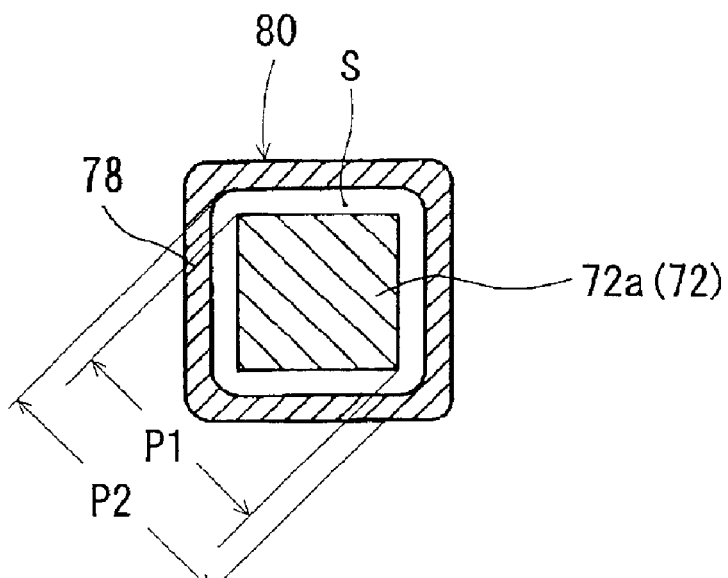
FIG. 11(A) is a cross-sectional view taken along line XI—XI in FIG. 9, which view illustrates that the rotational shaft is appropriately positioned within a connector sleeve.
FIG. 11(B) is a cross-sectional view taken along line XI—XI in FIG. 9, which view illustrates that the rotational shaft is inappropriately positioned within the connector sleeve.
Figure 11:
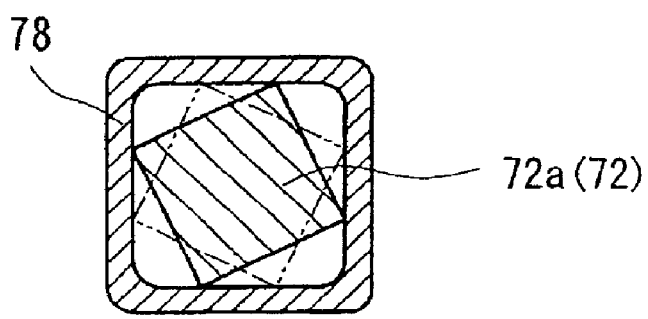

A first detailed representative embodiment of the present teachings is shown in FIGS. 1 to 5 and the first detailed representative embodiment is related to the above-described known seat reclining device shown in FIGS. 9 to 11. Therefore, it is only necessary to describe constructions of the first detailed representative embodiment that are different from constructions described with respect to the known seat reclining device. Elements that are the same in the known seat reclining device will be identified by the same reference numerals and further description of such elements and their operation will be omitted.

As shown in FIG. 1, a representative seat reclining device for a vehicle seat (not shown) may include a pair of seat reclining mechanisms, e.g., a first or outer seat reclining mechanism 10 and a second or inner seat reclining mechanism 60. The first seat reclining mechanism 10 preferably includes a first rotational rod or shaft 18 that corresponds to the first rotational shaft 72 of the known seat reclining mechanism 70. Similar to the first rotational shaft 72, the first rotational shaft 18 may include an inner extended portion 42 having a rectangular shape in cross section. In addition, the second reclining mechanism 60 may have substantially the same construction as the first reclining mechanism 10, except that the second reclining mechanism 60 may include a second rotational rod or shaft 62 that has an inner extended portion 64.

Similar to the known seat reclining device, the first rotational shaft 18 may be coupled to or interconnected with the second rotational shaft 62 via a connector sleeve 34 that includes first and second end portions 44 and 45. The first end portion 44 of the connector sleeve 34 may have a rectangular shape in cross section, which shape preferably corresponds to the rectangular shape of the inner extended portion 42 of the rotational shaft 18. The inner extended portion 42 may be inserted into the first end portion 44, to thereby form a nesting coupling 40, which will be further described below. On the other hand, the inner extended portion 64 may be inserted into and welded to the second end portion 45, thereby securely or fixedly connecting the inner extended portion 64 to the second end portion 45.

A variety of seat reclining mechanisms may be utilized with the present teachings and the present teachings and claims are not limited to the preferred seat reclining mechanisms described herein. Representative examples of other seat reclining mechanisms are described in U.S. Pat. Nos. 5,632,525, 5,899,533, 6,102,480, 6,318,805, 6,390,557, 4,470,633, 5,634,689 and 4,629,251, and U.S. Patent Publication No. 2002/0043852, the contents of which are hereby incorporated by reference in their entirety, and Japanese Laid-Open Patent Publication No. 8-228876. Simply stated, seat reclining mechanisms according to the present specification and claims generally include an seat cushion attachment (mounting portion), a seat back attachment (mounting portion) and a device for releasably locking the position of the seat cushion attachment relative to the seat the seat back attachment. A variety of lock mechanisms are known in the art and may be advantageously utilized with the present teachings. Further, such seat reclining mechanisms are also known in the art as recliner assemblies, hinge mechanisms and locking mechanisms, which terms are interchangeable with seat reclining mechanism.

Figure 3:
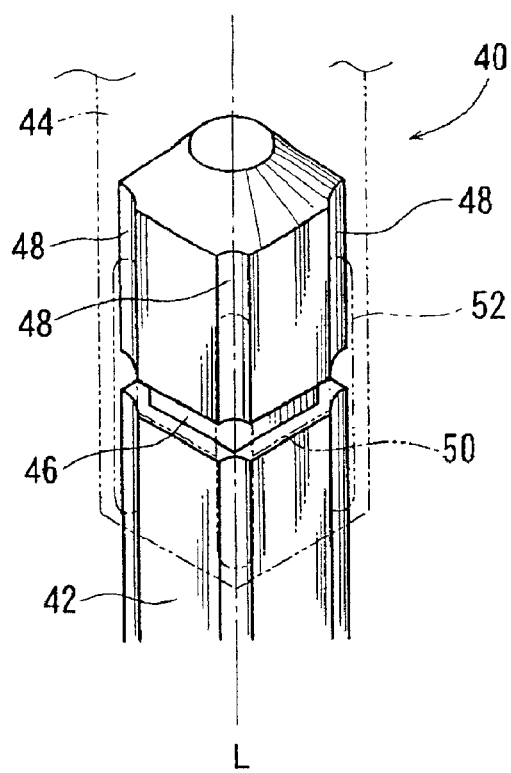
FIG. 3 is a perspective view of a nesting coupling according to a first embodiment of the present teachings.
Figure 4:
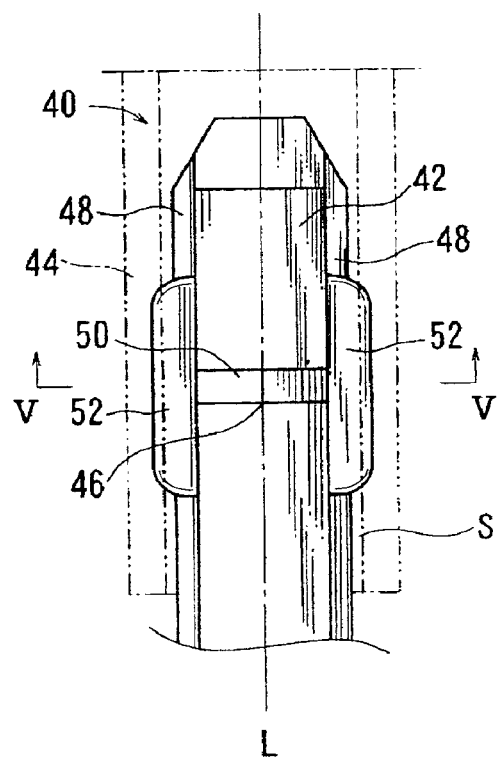
FIG. 4 is an elevational view of the nesting coupling shown in FIG. 3.
Figure 5:
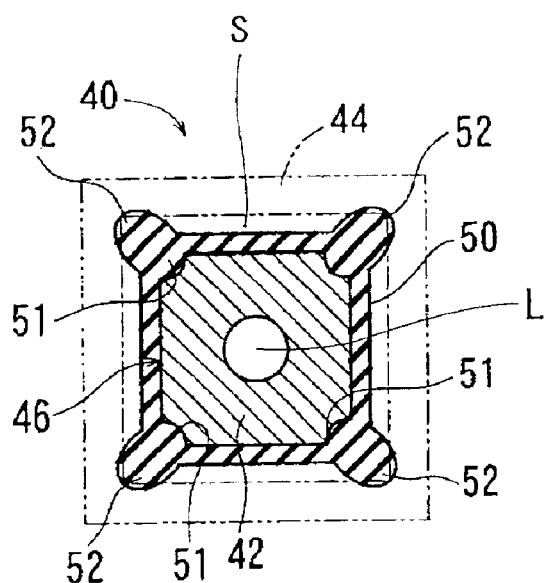
FIG. 5 is a cross-sectional view taken along line V—V shown in FIG. 4.

As shown in FIGS. 3 to 5, an annular groove 46 may be defined around the periphery of the inner extended portion 42. Further, the inner extended portion 42 may include four elongated grooves 48 that each longitudinally extend along the respective four corner edges of the inner extended portion 42. Each groove 48 may have a rounded or curved bottom surface. Thus, the elongated grooves 48 are preferably substantially perpendicular to the annular groove 46.

An elastic member 50 is preferably received within the annular groove 46. The elastic member 50 may be a one-piece construction (i.e., integrally formed) with a rectangular annular shape (closed loop) that substantially corresponds to the annular groove 46. Further, the elastic member 50 may be made of a rubber, an elastic synthetic resin or another type of elastic material. The elastic member 50 also may include four cushioning strips 52 that respectively correspond to the four elongated grooves 48. That is, the cushioning strips are preferably disposed substantially perpendicularly to the closed loop portion of the elastic member.

As best shown in FIG. 5, each cushioning strip 52 may include an inner elongated projection 51 that is configured so as to closely fit within the elongated groove 48. Thus, the elastic member 50 can be reliably attached to the inner extended portion 42 by disposing the cushioning strips 52 within the elongated grooves 48 in order to effectively prevent the elastic member 50 from rotating around and/or sliding along the inner extended portion 42.

When the elastic member 50 is attached to the inner extended portion 42 and the inner extended portion 42 is inserted into the first end portion 44 of the connector sleeve 34, the four cushioning strips 52 are respectively directed toward the four corners of the first end portion 44. Therefore, the cushioning strips 52 will be respectively guided along the corners of the first end portion 44 when the inner extended portion 42 is introduced into the first end portion 44. As a result, the inner extended portion 42 of the rotational shaft 18 may be reliably conformably positioned relative to the first end portion 44 of the connector sleeve 34 without contacting the first end portion 44 when the outer and inner reclining mechanisms 10 and 60 are mounted to the vehicle seat.

As will be recognized, the first rotational shaft 18 can freely rotate in either direction (clockwise and counterclockwise) with respect to the first end portion 44 of the connector sleeve 34, because the cushioning strips 52 of the elastic member 50 will flex or deform when compressed. As a result, if the outer reclining mechanism 10 is rotationally deviated in either direction with respect to the inner reclining mechanism 60 when the vehicle seat assembly is being mounted within the vehicle body, such relative deviation of the outer and inner reclining mechanisms 10 and 60 can be effectively compensated by the elastic member 50. Further, when the shaft 18 is rotated by operating the seat operation lever (handle) in order to unlock the reclining mechanisms 10 and 60, the cushioning strips 52 can be easily compressed in the rotating direction of the shaft 18. Thus, rotational motion of the first rotational shaft 18 can be reliably transmitted to the first end portion 44 of the connector sleeve 34.

In addition, the cushioning strips 52 can elastically support the inner extended portion 42 of the rotational shaft 18 within the first end portion 44 of the connector sleeve 34. Therefore, interference between the inner extended portion 42 and the first end portion 44 can be prevented, thereby minimizing or eliminating noise caused by such interference.

Second Detailed Representative Embodiment

Figure 6:
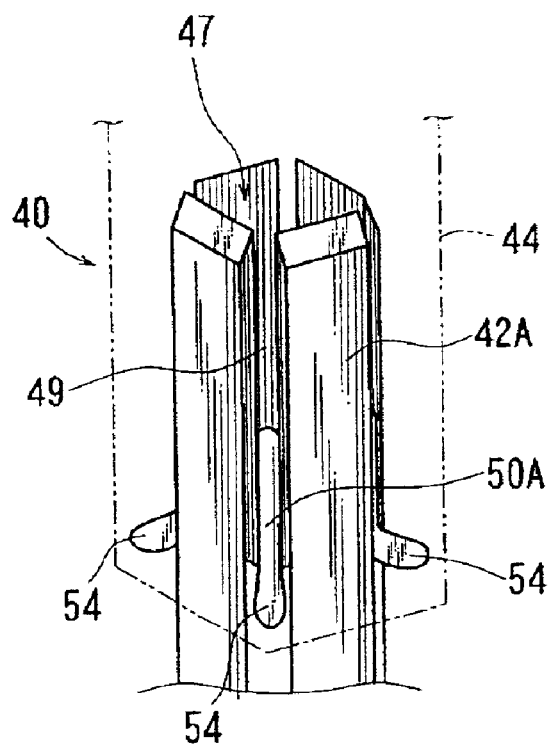
FIG. 6 is a perspective view of a nesting coupling according to a second embodiment of the present teachings.
Figure 7:
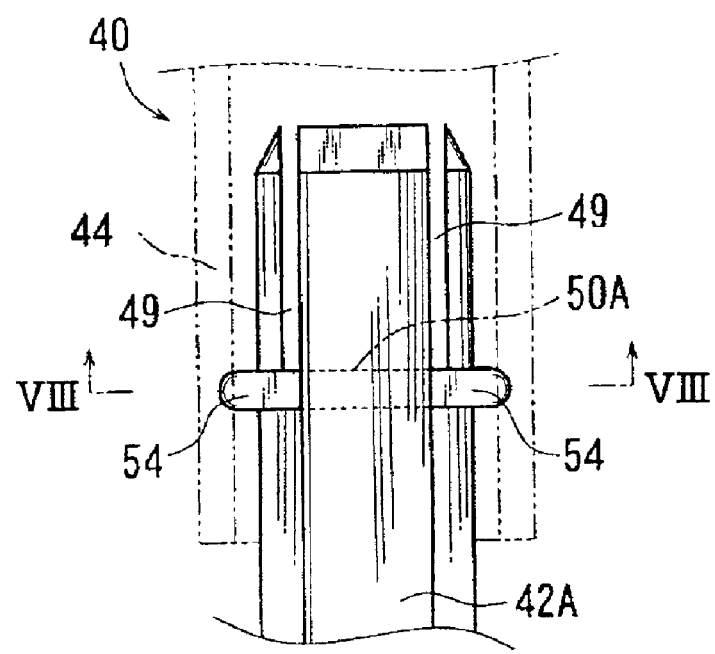
FIG. 7 is an elevational view of the nesting coupling shown in FIG. 6.
Figure 8:
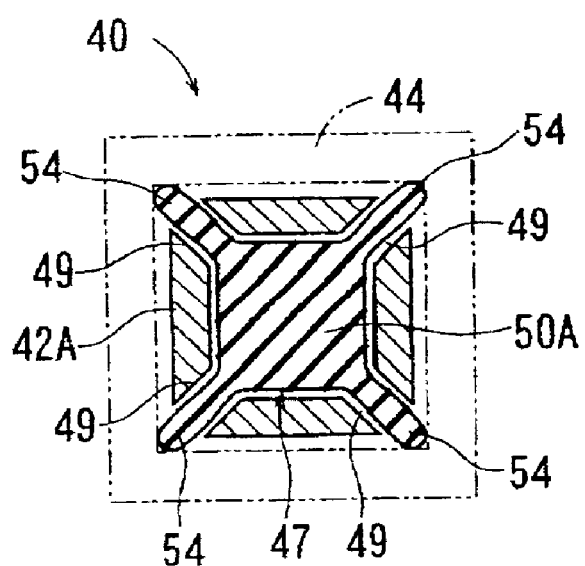
FIG. 8 is a cross-sectional view taken along line VIII—VIII shown in FIG. 7.

A second detailed representative embodiment of the present teachings is shown in FIGS. 6 to 8 and the second detailed representative embodiment is related to the first detailed representative embodiment. Therefore, it is only necessary to describe constructions of the second detailed representative embodiment that are different from constructions described in the first detailed representative embodiment.

The first rotational shaft 18 may include an inner extended portion 42A that corresponds to the inner extended portion 42 in the first representative embodiment. As shown in FIGS. 6 to 8, the inner extended portion 42A of the first rotational shaft 18 may also include a hollow end portion 47 and a rectangular cavity may be defined within the hollow end portion 47. Four elongated slots 49 may longitudinally extend along the respective four corner edges of the hollow end portion 47.

An elastic member 50A that is made from rubber, synthetic resin or other such elastic materials may be received within the hollow end portion 47. As in the first representative embodiment, the elastic member 50A may be a one-piece or integral construction and may have a rectangular shape that substantially corresponds to the rectangular cavity of the hollow end portion 47. Thus, the elastic member 50A may be closely received within the hollow end portion 47.

Further, the elastic member 50A may include four cushioning strips 54 that respectively correspond to the four slots 49. That is, the cushioning strips 54 are preferably disposed substantially perpendicularly with respect to a closed loop portion of the elastic member 50A. As best shown in FIG. 8, each cushioning strip 54 is preferably configured to engage the respective slot 49 and to outwardly project through the respective slot 49. Thus, the elastic member 50A having the cushioning strips 54 can be reliably attached to the inner extended portion 42A, such that the elastic member 50A will not rotate around or slide along the inner extended portion 42A.

Similar to the first representative embodiment, when the inner extended portion 42A is introduced or inserted into the first end portion 44, the cushioning strips 54 are respectively guided along the corners of the first end portion 44. As a result, the inner extended portion 42A may be reliably and appropriately positioned relative to the first end portion 44 of the connector sleeve 34 when the outer and inner reclining mechanisms 10 and 60 are mounted to the vehicle seat.

Although the respective inner extended portions 42 and 42A of the first rotational shaft 18 have a rectangular shape in cross section in the first and second representative embodiments, the first rotational shaft 18 may have a variety of cross-sectional shapes, such as a triangular shape, a pentagonal shape or other such polygonal shapes.

Further, although the nesting coupling 40 is formed between the first end portion 44 of the connector sleeve 34 and the first rotational shaft 18 of the outer reclining mechanism 10 in the first and second representative embodiments, the nesting coupling 40 can be, in addition or in the alternative, defined between the second end portion 45 of the connector sleeve 34 and the second rotational shaft 62 of the inner reclining mechanism 60.

Moreover, although the respective elastic member 50 and 50A are attached to the inner extended portion 42 and 42A of the first rotational shaft 18 in the first and second representative embodiments, the elastic member 50 or 50A can be modified and attached to the first end portion 44 of the connector sleeve 34.

What is claimed is:

1. A seat reclining device for a vehicle seat, comprising:
a first seat reclining mechanism having a first rotational shaft,
a second seat reclining mechanism having a second rotational shaft,
a connector sleeve coupling the first and second rotational shafts such that the rotational shafts can be substantially synchronously rotated, wherein a nesting coupling is defined between the connector sleeve and the first rotational shaft, and a clearance is defined between the connector sleeve and the first rotational shaft so as to permit a relative rotation of the connector sleeve and the first rotational shaft, and
an elastic member disposed within the clearance, wherein the elastic member is arranged and constructed such that the first rotational shaft is substantially evenly spaced apart from the connector sleeve in both rotational directions when the first rotational shaft is introduced into the connector sleeve so that relative rotational deviation of the first and second seat reclining mechanisms in either rotational direction can be compensated by deformation of the elastic member when the vehicle seat is mounted on a vehicle body.

2. The seat reclining device as defined in claim 1, wherein an annular groove is defined within the first rotational shaft and encircles the first rotational shaft, and wherein the elastic member is disposed within the annular groove.

3. The seat reclining device as defined in claim 2, wherein the elastic member includes a plurality of cushioning strips that are arranged and constructed to contact the connector sleeve.

4. The seat reclining device as defined in claim 3, wherein a plurality of additional grooves are defined within the first rotational shaft, the additional grooves being arranged and constructed to receive the respective cushioning strips.

5. The seat reclining device as defined in claim 4, wherein the first rotational shaft has a rectangular shape in cross section, and wherein the additional grooves respectively extend along corner edges of the first rotational shaft.

6. The seat reclining device as defined in claim 5, wherein the elastic member is attached to the first rotational shaft and contacts the connector sleeve.

7. The seat reclining device as defined in claim 6, wherein the clearance comprises a continuous annular clearance that encircles the first rotational shaft.

8. The seat reclining device as in claim 7, wherein the first seat reclining mechanism includes a first locking means for locking and unlocking rotational movement of the first seat reclining mechanism, wherein the first rotational shaft is coupled to the locking means and the first rotational shaft includes an extended portion that has a polygonal shape in cross section;
   wherein the second seat reclining mechanism includes a second locking means for locking and unlocking rotational movement of the second seat reclining mechanism, wherein the second rotational shaft is coupled to the second locking means;
   wherein the connector sleeve has a polygonal shape in cross section and is arranged and constructed to be connected to the second rotational shaft at one end and to receive the extended portion of the first rotational shaft at the other end such that the first and second rotational shafts can be substantially synchronously rotated when either the first or second rotational shaft is rotated, thereby synchronously unlocking the first and second seat reclining mechanisms; and
   wherein the elastic member is interleaved between the connector sleeve and the extended portion of the first rotational shaft in order to prevent the extended portion from directly contacting the connector sleeve.

9. The seat reclining device as defined in claim 1, wherein the first rotational shaft comprises a hollow end portion, a cavity is defined within the hollow end portion, and a plurality of slots extend along the hollow end portion and communicate with the cavity, and wherein the elastic member is disposed within the cavity and partly projects through the slots.

10. A seat reclining device as defined in claim 9, wherein the elastic member includes a plurality of cushioning strips that project through the respective slots and contact the connector sleeve.

11. A seat reclining device as defined in claim 10, wherein the first rotational shaft has a rectangular shape in cross section, and wherein the slots respectively extend along corner edges of the first rotational shaft.

12. A seat reclining device as defined in claim 11, wherein the elastic member is attached to the first rotational shaft and contacts the connector sleeve.

13. The seat reclining device as defined in claim 12, wherein the clearance comprises a continuous annular clearance that encircles the first rotational shaft.

14. The seat reclining device as in claim 13, wherein the first seat reclining mechanism includes a first locking means for locking and unlocking rotational movement of the first seat reclining mechanism, wherein the first rotational shaft is coupled to the locking means and the first rotational shaft includes an extended portion that has a polygonal shape in cross section;
   wherein the second seat reclining mechanism includes a second locking means for locking and unlocking rotational movement of the second seat reclining mechanism, wherein the second rotational shaft is coupled to the second locking means;
   wherein the connector sleeve has a polygonal shape in cross section and is arranged and constructed to be connected to the second rotational shaft at one end and to receive the extended portion of the first rotational shaft at the other end such that the first and second rotational shafts can be substantially synchronously rotated when either the first or second rotational shaft is rotated, thereby synchronously unlocking the first and second seat reclining mechanisms; and
   wherein the elastic member is interleaved between the connector sleeve and the extended portion of the first rotational shaft in order to prevent the extended portion from directly contacting the connector sleeve.

15. The seat reclining device as defined in claim 1, wherein the clearance comprises a continuous annular clearance that encircles the first rotational shaft.

16. The seat reclining device as in claim 1, wherein the first seat reclining mechanism includes a first locking means for locking and unlocking rotational movement of the first seat reclining mechanism, wherein the first rotational shaft is coupled to the locking means and the first rotational shaft includes an extended portion that has a polygonal shape in cross section;
   wherein the second seat reclining mechanism includes a second locking means for locking and unlocking rotational movement of the second seat reclining mechanism, wherein the second rotational shaft is coupled to the second locking means;
   wherein the connector sleeve has a polygonal shape in cross section and is arranged and constructed to be connected to the second rotational shaft at one end and to receive the extended portion of the first rotational shaft at the other end such that the first and second rotational shafts can be substantially synchronously rotated when either the first or second rotational shaft is rotated, thereby synchronously unlocking the first and second seat reclining mechanisms; and
   wherein the elastic member is interleaved between the connector sleeve and the extended portion of the first rotational shaft in order to prevent the extended portion from directly contacting the connector sleeve.

17. A seat reclining device for a vehicle seat, comprising:
   a first means for tilting and locking a seat back frame with respect to a seat cushion frame, the first means including a first rotational shaft,
   a second means for tilting and locking the seat back frame with respect to the seat cushion frame, the second means including a second rotational shaft,
   means for coupling the first and second rotational shafts such that the first and second rotational shafts can be substantially synchronously rotated, wherein the first rotational shaft is inserted within the coupling means and a substantially annular, continuous clearance is defined between the coupling means and the first rotational shaft so as to permit a relative rotation of the coupling means and the first rotational shaft, and an elastic member disposed within the clearance, wherein the elastic member is arranged and constructed such that the first rotational shaft is substantially evenly spaced apart from the coupling means in both rotational directions when the first rotational shaft is introduced into the coupling means so that relative rotational deviation of the first and second seat reclining mechanisms in either rotational direction can be compensated by deformation of the elastic member when the vehicle seat is mounted on a vehicle body.

18. The seat reclining device as defined in claim 17, wherein an annular groove that receives the elastic member and a plurality of elongated grooves are defined within the first rotational shaft, the elastic member further comprising a plurality of elongated cushioning strips that are disposed within the respective elongated grooves.

19. The seat reclining device as defined in claim 17, wherein the first rotational shaft comprises a hollow end portion, a cavity is defined within the hollow end portion, and a plurality of slots extend along the hollow end portion and communicate with the cavity, and wherein the elastic member further comprises a plurality of cushioning strips that partly project through the respective slots.

* * * * *